(12) United States Patent
Petri

(10) Patent No.: US 9,053,113 B2
(45) Date of Patent: Jun. 9, 2015

(54) AUTONOMIC GENERATION OF DOCUMENT STRUCTURE IN A CONTENT MANAGEMENT SYSTEM

(75) Inventor: John Edward Petri, Lewiston, MN (US)

(73) Assignee: International Business Machines Corporation, Armonk, NY (US)

(*) Notice: Subject to any disclaimer, the term of this patent is extended or adjusted under 35 U.S.C. 154(b) by 2568 days.

(21) Appl. No.: 11/692,606

(22) Filed: Mar. 28, 2007

(65) Prior Publication Data

US 2008/0244382 A1    Oct. 2, 2008

(51) Int. Cl.
*G06F 17/00*    (2006.01)
*G06F 17/30*    (2006.01)
*G06F 17/22*    (2006.01)

(52) U.S. Cl.
CPC .... *G06F 17/30085* (2013.01); *G06F 17/30905* (2013.01); *G06F 17/2247* (2013.01); *G06F 17/30923* (2013.01)

(58) Field of Classification Search
CPC ................................................ G06F 17/30905
USPC ........................................................ 715/234
See application file for complete search history.

(56) References Cited

U.S. PATENT DOCUMENTS

| | | | |
|---|---|---|---|
| 7,107,535 B2* | 9/2006 | Cohen et al. | 715/736 |
| 7,181,731 B2* | 2/2007 | Pace et al. | 717/136 |
| 7,483,923 B2* | 1/2009 | Novik | 1/1 |
| 7,593,845 B2* | 9/2009 | Ramsey | 704/9 |
| 7,669,119 B1* | 2/2010 | Orelind et al. | 715/234 |
| 7,720,890 B2* | 5/2010 | Rao et al. | 707/821 |
| 2005/0096951 A1* | 5/2005 | Ye et al. | 705/7 |

OTHER PUBLICATIONS

Li et al., "An Integrated Framework on Mining Logs Files for Computing System Management" KDD 05, Aug. 21-24, 2005, copyright ACM, pp. 776-781.*
Dobson, et al., "A Survey of Autonomic Communications", ACM Transactions on Autonomous and Adaptive Systems, vol. 1, No. 2, Dec. 2006, pp. 223-259.*
XML Application Development Guide, documentum, version 5.2.5, Mar. 2004, 331 pages.

* cited by examiner

Primary Examiner — Amelia Tapp
(74) Attorney, Agent, or Firm — Martin & Associates, LLC

(57) ABSTRACT

A content management system (CMS) autonomically generates structure for a document when a synchronization rule references structure that does not exist in the document. A dynamic structure policy specifies at least one criterion that determines if and how the structure is autonomically generated. By autonomically generating structure in a document, a CMS administrator or CMS user (such as the author) is relieved of the manual task of generating the structure before the synchronization rule can be successfully processed. Once dynamically generated, the added structure may be auto-populated with dummy data or with default data specified in the autonomic structure policy.

19 Claims, 5 Drawing Sheets

US 9,053,113 B2

AUTONOMIC GENERATION OF DOCUMENT STRUCTURE IN A CONTENT MANAGEMENT SYSTEM

BACKGROUND

1. Technical Field

This disclosure generally relates to content management systems, and more specifically relates to a content management system that autonomically generates structure during the processing of synchronization rules.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content is checked by the CMS to make sure the content conforms to predefined rules. A user may also check out content from the repository, or link to content in the repository while generating content. The rules in a CMS assure that content to be checked in or linked to meets desired criteria specified in the rules.

Known content management systems check their rules when content is being checked in. If the rule is satisfied, the content is checked into the repository. If the rule is not satisfied, the content is not checked into the repository. Known content management systems may include rules related to bursting, linking, and synchronization. Bursting rules govern how a document is bursted, or broken into individual chunks, when the document is checked into the repository. By bursting a document into chunks, the individual chunks may be potentially reused later by a different author. Linking rules govern what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

Known content management systems may not process a synchronization rule correctly if the synchronization rule identifies one or more structures that do not exist in a document. Thus, in order for a new synchronization rule that defines new structures to be correctly processed, first the CMS administrator or a CMS user (such as the author of the document) has to manually add the new structures to the document. Once the document has the new structure, the new synchronization rule that references the new structure may be properly processed. Without a way to automate some of the manual tasks normally performed by a CMS administrator, the computer industry will continue to suffer from the manual tasks that must be performed when a new synchronization rule that references new structures needs to be processed.

BRIEF SUMMARY

A content management system (CMS) autonomically generates structure for a document when a synchronization rule references structure that does not exist in the document. A dynamic structure policy specifies at least one criterion that determines if and how the structure is autonomically generated. By autonomically generating structure in a document, a CMS administrator is relieved of the manual task of generating the structure before the synchronization rule can be successfully processed. Once dynamically generated, the added structure in the document may be auto-populated with dummy data or with default data specified in the autonomic structure policy.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a content management system (CMS) that autonomically generates structure for a document during the processing of synchronization rules when a synchronization rule specifies content in the document that does not exist. An autonomic structure policy may govern how missing structure in the document is autonomically generated. Once dynamically generated, the added structure may be auto-populated with dummy data or with default data specified in the autonomic structure policy.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
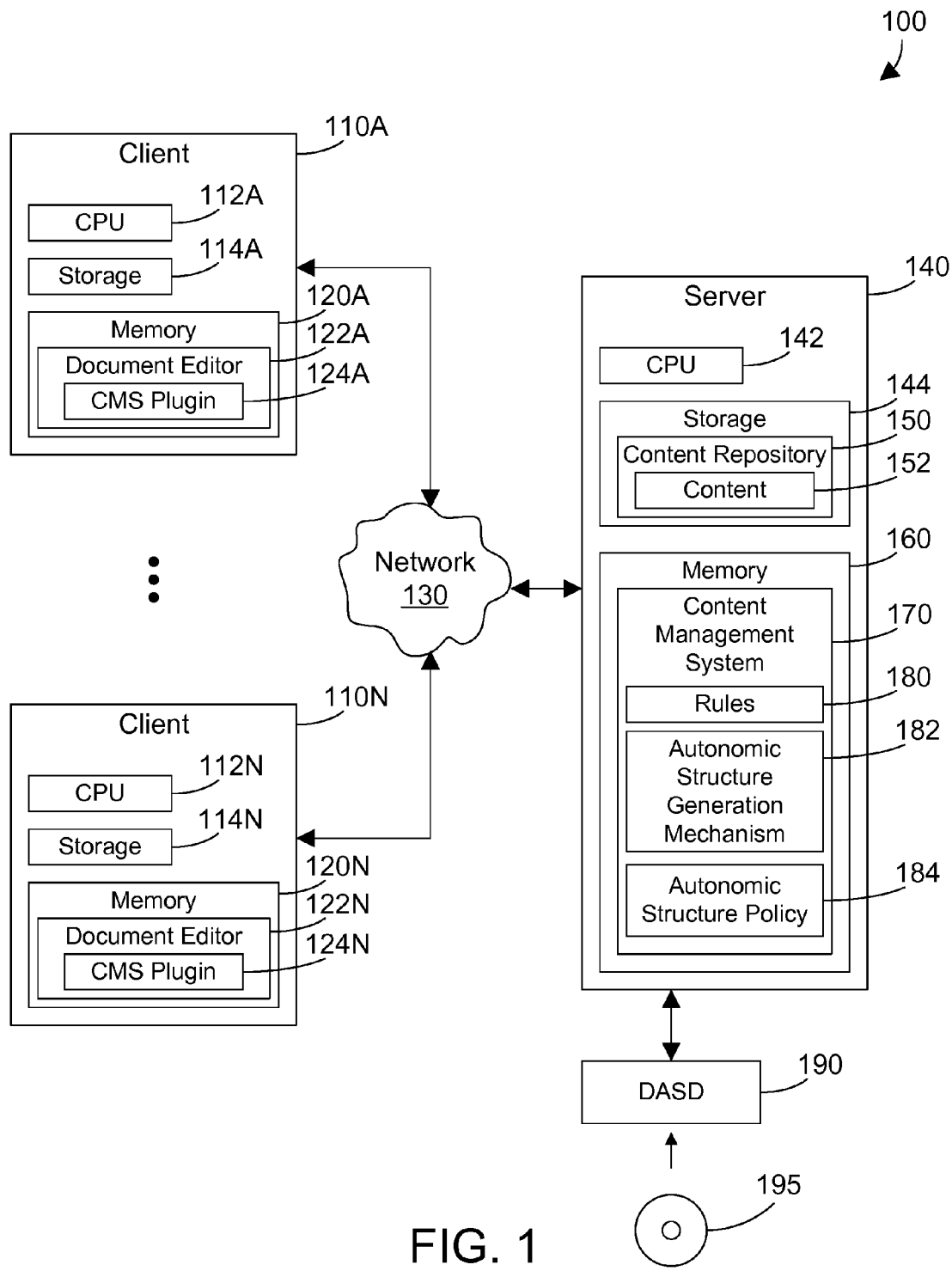
FIG. 1 is a block diagram of a networked computer system that includes a server computer system that has a content management system that includes an autonomic structure generation mechanism.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 11A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes rules 180, an autonomic structure generation mechanism 182, and may optionally include an autonomic structure policy 184. Rules 180 may include bursting rules, linking rules, and synchronization rules. Of course, other rules, whether currently known or developed in the future, could also be included in rules 180. Autonomic structure generation mechanism 182 detects when a synchronization rule specifies structure that is not present in the document, and may autonomically generate the structure as governed by the autonomic structure policy 184. The autonomic structure policy 184 specifies one or more criteria that governs the autonomic generation of structure for a document during the processing of a synchronization rule.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
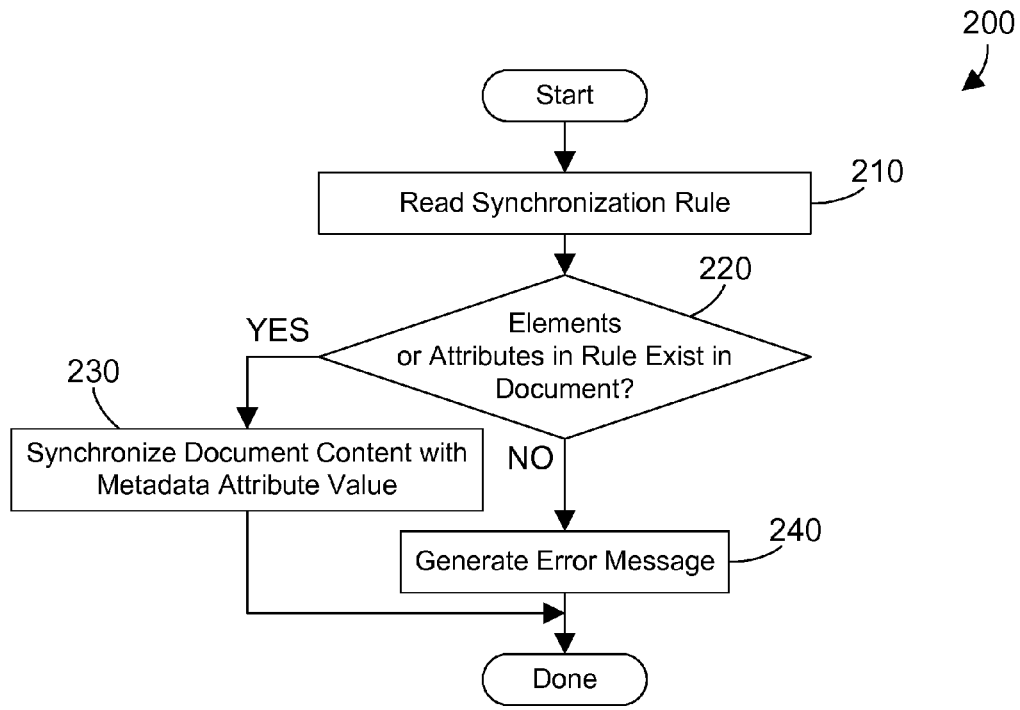
FIG. 2 is a flow diagram of one possible method for processing a synchronization rule.

Referring to FIG. 2, one possible method 200 for processing synchronization rules in a CMS begins by reading a synchronization rule (step 210). If all of the elements or attributes in the synchronization rule exist in the document (step 220=YES), the document content is synchronized with the values of attributes in the metadata, or vice versa (step 230). If one or more of the elements or attributes in the synchronization rule do not exist in the document (step 220=NO), the CMS generates an error message (step 240). In other similar methods for processing synchronization rules, step 220 could be replaced with a step that synchronizes all elements in the document that are present but does not synchronize any missing elements in the document, or step 220 could be replaced with a step that simply skips the synchronization rule without generating an error message.

Figure 3:
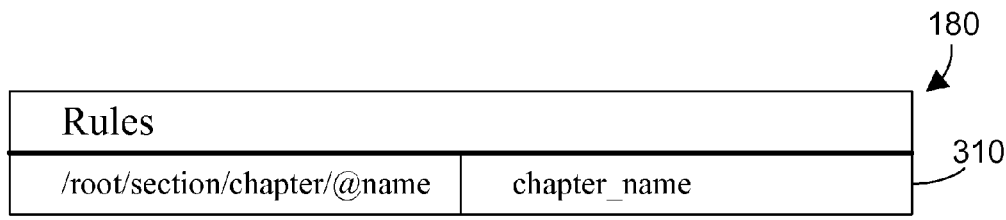
FIG. 3 is a table showing a sample synchronization rule.
Figure 4:
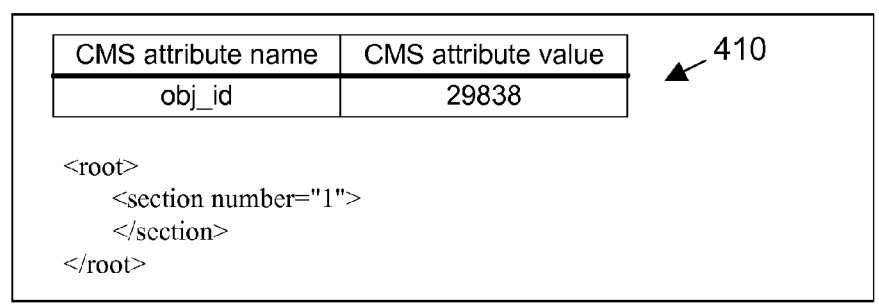
FIG. 4 is a sample XML document.

A simple example is now provided to illustrate the method 200 in FIG. 2. We assume a CMS has rules 180 that include a synchronization rule 310 that specifies an XPath expression /root/section/chapter/@name, which is to synchronized with the chapter_name attribute, as shown in FIG. 3. FIG. 4 shows a sample document 400 in a repository in a content management system. Document 400 includes a header 410 that specifies attribute names and values. The attribute named obj_id is used to uniquely identify the object 400 in the repository, and has a value of 29838. The body of document 400 includes XML code that includes a root element and a section element. If the synchronization rule 310 is processed according to method 200 in FIG. 2, the rule is read (step 210). There is a chapter element and name attribute in the rule that does not exist in the document 400 in FIG. 4 (step 220=NO). As a result, an error message is generated (step 240) due to the missing structure in the document 400.

Figure 5:
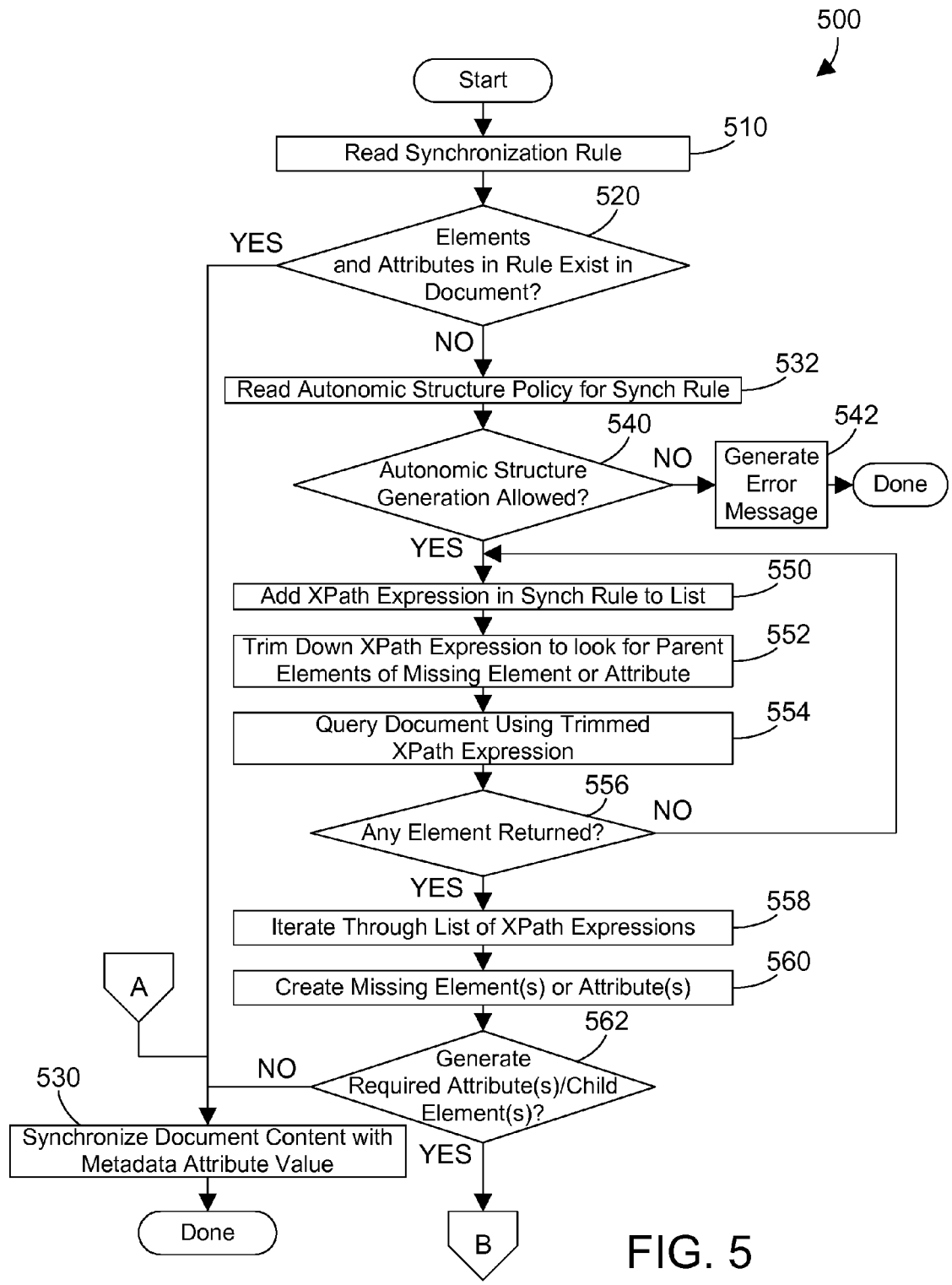
FIGS. 5 and 6 are different portions of the same flow diagram of a method for processing a synchronization rule, where the method may include autonomic generation of structure in the document.

The disclosure and claims herein improve on method 200 by allowing autonomic generation of missing structure in a document when processing a synchronization rule in a content management system. Referring to FIG. 5, method 500 begins by reading the synchronization rule (step 510). If all elements and attributes in the synchronization rule exist in the document (step 520=YES), the document content is synchronized with the metadata attribute value (step 530). Note that step 530 may be bidirectional synchronization, meaning a change to the document content may cause a corresponding change to the metadata attribute value, or a change to the metadata attribute value may also cause a corresponding change to the document content. If there are elements or attributes in the synchronization rule that are missing in the document (step 520=NO), the autonomic structure policy corresponding to the synchronization rule is read (step 532). If autonomic structure generation is not allowed by the autonomic structure policy, an error is generated (step 542), and method 500 is done. If autonomic structure generation is allowed by the autonomic structure policy (step 540=YES), the XPath expression in the synchronization rule is added to a list (step 550). The XPath expression is then trimmed down to look for parent elements of the missing element or attribute (step 552). The document is then queried using the trimmed XPath expression (step 554). If no parent element is returned (step 556=NO), method 500 loops back to step 550 and continues in a recursive manner until either a parent is found, or the root of the document is found (step 556=YES). The list of XPath expressions is then iterated through (step 558), and the missing elements or attributes are then autonomically created in the document (step 560). The autonomic generation of attributes or child elements in step 560 is performed on elements generated from the XPath list. If the autonomic structure policy specifies not to autonomically generate required attributes or child elements (step 562=NO), the synchronization is performed (step 530), and method 500 is done. If the autonomic structure policy specifies to autonomically generate required attributes or child elements (step 562=YES), control passes to marker B in FIG. 6. The required attributes and/or child elements are then generated according to the document's schema (step 570). If the autonomic structure policy specifies to autonomically populate the newly added attributes or elements with data (step 580=YES), the data values are added (step 590). If the autonomic structure policy specifies not to autonomically populate the newly added attributes or elements with data (step 580=NO), or after step 590 is complete, control passes to marker A in FIG. 5. The synchronization is then performed (step 530), and method 500 is done.

Figures 6, 7:
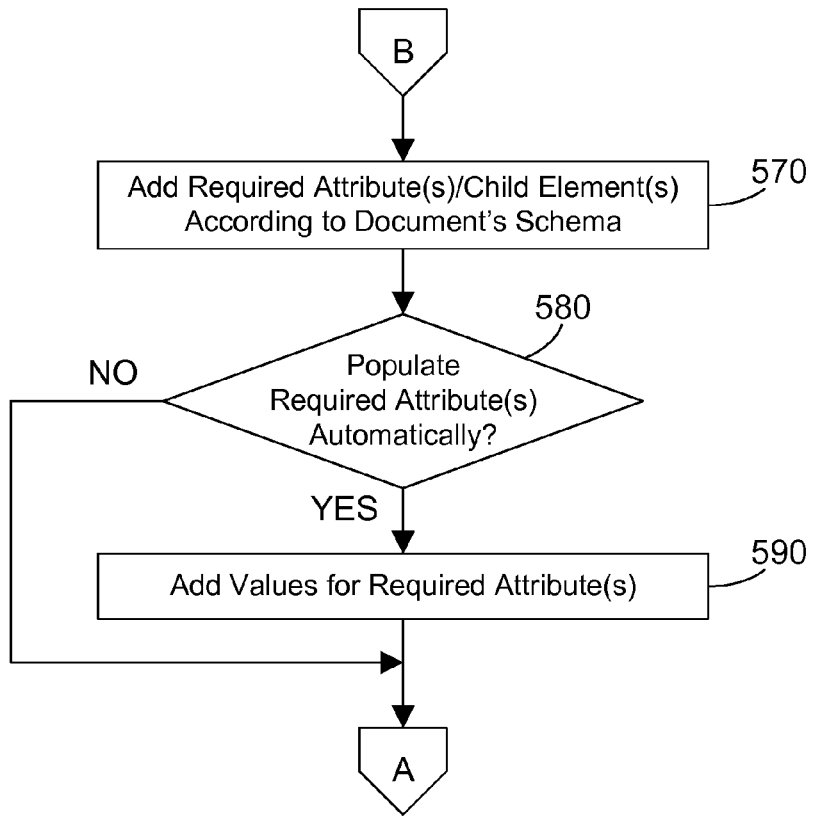
FIG. 7 shows a table with a sample autonomic structure policy.

One suitable example of an autonomic structure policy 184 in FIG. 1 is shown in FIG. 7. This specific example specifies whether autonomic structure generation is allowed at 710; whether autonomic generation of all attributes and elements in the XPath list is allowed at 720; whether to auto-populate newly created elements or attributes with data at 730; and if so, whether to auto-populate the newly created elements with dummy data at 740 or default data at 750, where the default data is explicitly specified in field 752. The specific policy in FIG. 7 specifies that autonomic structure generation is allowed (710=YES), autonomic generation of all attributes and elements is allowed (720=YES), and auto-populate of required attributes is not allowed (730=NO). Note the Dummy Data at 740 and Default Data at 750 and 752 may only be selected when 730 is YES. Because 730 is NO in FIG. 7, the values in 740, 750 and 752 are grayed out, indicating these cannot be changed by the user as long as 730=NO.

Figure 8:
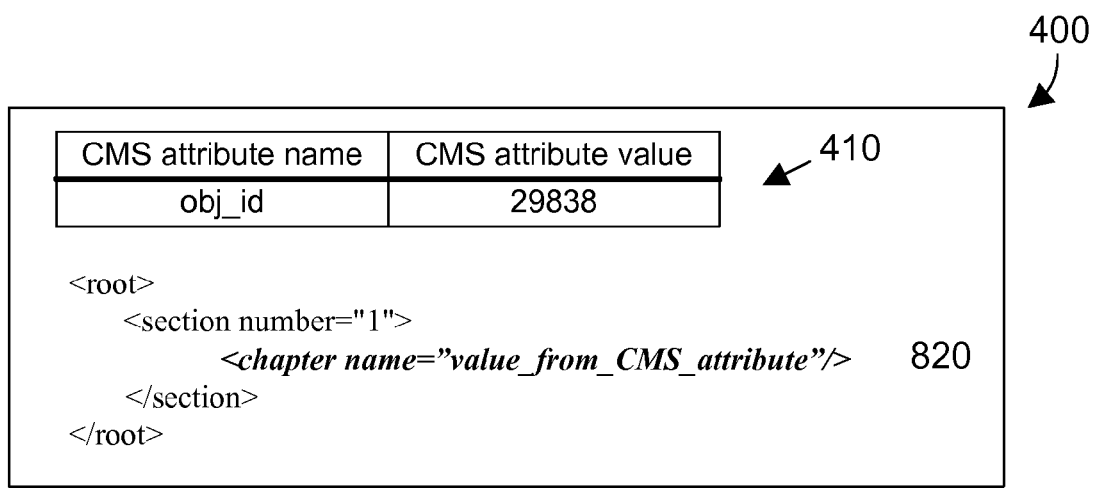
FIG. 8 shows the object 400 in FIG. 4 after the autonomic structure generation mechanism 182 in FIG. 1 adds the chapter element and name attribute.

We now determine how method 500 in FIGS. 5 and 6 would process the specific example synchronization rule 310 in FIG. 3 on the document 400 in FIG. 4. First, the synchronization rule 310 in FIG. 3 is read (step 510). The synchronization rule includes a chapter element and a name attribute that does not exist in document 400 (step 520=NO), so the autonomic structure policy 184 in FIG. 7 is read (step 532), which we assume is the policy for the synchronization rule 310 in FIG. 3. Autonomic structure generation is allowed at 710 in FIG. 7 (step 540=YES), so the original XPath expression from the rule, namely /root/section/chapter/@name is added to a list (step 550). This expression is then trimmed to /root/section/chapter (step 552). The document is then queried using the trimmed expression /root/section/chapter. No element was returned in response to the query (step 556=NO) because the chapter element does not exist in the document. The trimmed XPath expression /root/section/chapter is added to the list (step 550). This expression is trimmed to /root/section (step 552). The document is then queried using the trimmed expression /root/section (step 554). There is a /root/section element in the document 400 (step 556=YES). Next, method 500 iterates through the list of XPath expressions (step 558) and creates the missing element(s) or attribute(s) (step 560). The most recent expression added to the list was /root/section/chapter, which causes the chapter element to be created under the section element in step 560. Next, the first expression added to the list was /root/section/chapter/@name, which causes the name attribute to be created in the chapter element in step 560. The policy 184 in FIG. 7 specifies at 730 to not auto-populate the newly added elements (step 562=NO), so the document and metadata are synchronized (step 530), and method 500 is done. The result is document 400 shown in FIG. 8 that includes the newly added chapter element with name attribute as shown at 820 in bold and italics.

The autonomic structure generation mechanism disclosed and claimed herein processes a synchronization rule, determines when the synchronization rule references elements or attributes that do not exist in the document, and autonomically generates one or more missing elements or attributes in the document. This allows the simple definition of a synchronization rule that specifies missing structure to cause the autonomic generation of that structure without the need for a CMS administrator to even be aware of the autonomically added structure.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
   at least one processor;
   a memory coupled to the at least one processor; and
   a content management system residing in the memory and executed by the at least one processor, the content management system managing a plurality of documents in a repository, the content management system comprising:
      an autonomic structure generation mechanism that detects when the content management system processes a synchronization rule for a document, the synchronization rule governing synchronization between content in the document and metadata related to the content in the document, the synchronization rule specifying structure that does not exist in the document, the autonomic structure generation mechanism autonomically generating in the document at least a portion of the specified structure that does not exist.

2. The apparatus of claim 1 wherein the specified structure that does not exist comprises at least one element.

3. The apparatus of claim 2 wherein the specified structure that does not exist further comprises at least one attribute.

4. The apparatus of claim 1 wherein the specified structure that does not exist comprises at least one attribute.

5. The apparatus of claim 1 wherein the autonomic structure generation mechanism autonomically populates with data at least one autonomically-generated structure in the document.

6. The apparatus of claim 1 further comprising an autonomic structure policy that specifies at least one criterion that determines how the autonomic structure generation mechanism generates the portion of the specified structure that does not exist.

7. A computer-implemented method for autonomically generating structure in a document in a content management system, the method comprising the steps of:
   reading a synchronization rule for the document that specifies structure that does not exist in the document, the synchronization rule governing synchronization between content in the document and metadata related to the content in the document; and
   autonomically generating in the document at least a portion of the specified structure that does not exist.

8. The method of claim 7 wherein the specified structure that does not exist comprises at least one element.

9. The method of claim 8 wherein the specified structure that does not exist further comprises at least one attribute.

10. The method of claim 7 wherein the specified structure that does not exist comprises at least one attribute.

11. The method of claim 7 further comprising the step of autonomically populating with data at least one autonomically-generated structure in the document.

12. The method of claim 7 further comprising an autonomic structure policy that specifies at least one criterion that determines how the portion of the specified structure that does not exist is autonomically generated in the document.

13. A computer-implemented method for autonomically generating an element in an XML document in a content management system, the method comprising the steps of:
   (1) reading a synchronization rule;
   (2) determining whether the synchronization rule references an element that does not exist in the XML document;
   (3) if the synchronization rule references an element that does not exist in the XML document, performing the steps of:
      (3A) reading an autonomic structure policy corresponding to the synchronization rule;
      (3B) determining from the autonomic structure policy whether autonomic structure generation is allowed;
      (3C) if autonomic structure generation is allowed, performing the steps of:
         (3C1) adding an XPath expression to a list;
         (3C2) trimming the XPath expression to look for at least one parent element of missing element;
         (3C3) querying the XML document using the trimmed XPath expression;
         (3C4) if the query using the trimmed XPath expression does not return any ancestor elements or a root element, repeating steps (3C1) through (3C4);
         (3C5) if the query using the trimmed XPath expression returns an ancestor element or the root element, performing the steps of:
            (3C5a) iterating through the list of XPath expressions;
            (3C5b) creating in the XML document the element that does not exist;
      (3D) determining from the autonomic structure policy whether autonomic generation of child elements is allowed;
      (3E) if autonomic generation of child elements is allowed, autonomically generating any child elements in the document for the element created in step (3C5b);
      (3F) determining from the autonomic structure policy whether autonomic population of data in autonomically generated elements is allowed; and
      (3G) if autonomic population of data in the autonomically generated elements in the XML document is allowed, autonomically populating the autonomically generated elements in the XML document with data specified in the autonomic structure policy.

14. An article of manufacture comprising:
   (A) a content management system that manages a plurality of documents in a repository, the content management system comprising:
      an autonomic structure generation mechanism that detects when a content management system processes a synchronization rule for a document, the synchronization rule governing synchronization between content in the document and metadata related to the content in the document, the synchronization rule specifying structure that does not exist in the document, the autonomic structure generation mechanism autonomically generating in the document at least a portion of the specified structure that does not exist; and
   (B) computer-readable media bearing the content management system.

15. The article of manufacture of claim 14 wherein the specified structure that does not exist comprises at least one element.

16. The article of manufacture of claim 15 wherein the specified structure that does not exist further comprises at least one attribute.

17. The article of manufacture of claim 14 wherein the specified structure that does not exist comprises at least one attribute.

18. The article of manufacture of claim 14 wherein the autonomic structure generation mechanism autonomically populates with data at least one autonomically-generated structure in the document.

19. The article of manufacture of claim 14 further comprising an autonomic structure policy that specifies at least one criterion that determines how the autonomic structure generation mechanism generates the portion of the specified structure that does not exist.

* * * * *